United States Patent [19]
Raith et al.

[11] Patent Number: 6,040,800
[45] Date of Patent: Mar. 21, 2000

[54] SYSTEMS AND METHODS FOR LOCATING REMOTE TERMINALS IN RADIOCOMMUNICATION SYSTEMS

[75] Inventors: Alex K. Raith, Durham; Rajaram Ramesh; Karl Molnar, both of Cary; R. David Koilpillai, Apex; Havish Koorapaty, Raleigh, all of N.C.

[73] Assignee: Ericsson Inc., Research Triangle Park, N.C.

[21] Appl. No.: 08/839,864

[22] Filed: Apr. 22, 1997

[51] Int. Cl.[7] .................................. G01S 1/24; G01S 3/02
[52] U.S. Cl. ........................... 342/387; 342/457; 342/465
[58] Field of Search .................................. 342/387, 457, 342/458, 465; 455/456

[56] References Cited

U.S. PATENT DOCUMENTS

| | | | |
|---|---|---|---|
| 3,209,357 | 9/1965 | Wyatt | 342/357.01 |
| 4,494,119 | 1/1985 | Wimbush | 342/457 |
| 4,724,357 | 5/1988 | Rackley | 342/457 |
| 4,928,107 | 5/1990 | Kuroda et al. | 342/457 |
| 5,003,317 | 3/1991 | Gray et al. | 342/457 |
| 5,166,694 | 11/1992 | Russell et al. | 342/457 |
| 5,175,867 | 12/1992 | Wejke et al. | 455/33.1 |
| 5,327,144 | 7/1994 | Stilp et al. | 342/387 |
| 5,353,332 | 10/1994 | Raith et al. | 379/59 |
| 5,499,386 | 3/1996 | Karlsson | 455/33.2 |
| 5,600,706 | 2/1997 | Dunn et al. | 342/457 |
| 5,666,662 | 9/1997 | Shibuya | 455/456 |

FOREIGN PATENT DOCUMENTS

| | | |
|---|---|---|
| 484918 | 5/1992 | European Pat. Off. |
| 528627 | 2/1993 | European Pat. Off. |

OTHER PUBLICATIONS

G.A. Mizusawa, "*Radio Frequency Position Location Systems Review*", Technical Report MPRG–TR–96–16, pp. 1–55, Bradley Dept. of Electrical Engineering, Virginia Tech, 1996.

D.J. Torrieri, "*Statistical Theory of Passive Location Systems*", IEEE Tranbsactions on Aerospace and Electronics Systems, vol. AES20, No. 2, pp. 183–198 (Mar. 1984).

Louis A. Stilp, "*Time Difference of Arrival Technology for Locating Narrowband Cellular Signals*", Proceedings of the SPIE, vol. 2602, pp. 134–144 (1996).

European Standard Search Report re RS 99500 Date of completion of Search: Oct. 6, 1997.

*Primary Examiner*—Gregory C. Issing
*Attorney, Agent, or Firm*—Burns, Doane, Swecker & Mathis, L.L.P.

[57] ABSTRACT

Emergency call handling may, in the near future, require terminal unit location information to be provided to emergency service centers. Exemplary embodiments of the present invention provide improved techniques for using a system of monitoring or adjunct stations to provide this location information to the emergency service centers. For example, either time of arrival (TOA) or time difference of arrival (TDOA) techniques can be selectively used to process received signals and provide location information. Techniques for improving timing estimates are also disclosed.

12 Claims, 6 Drawing Sheets

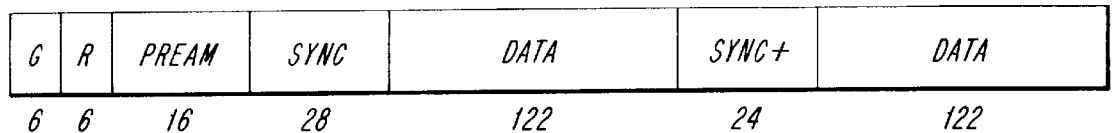
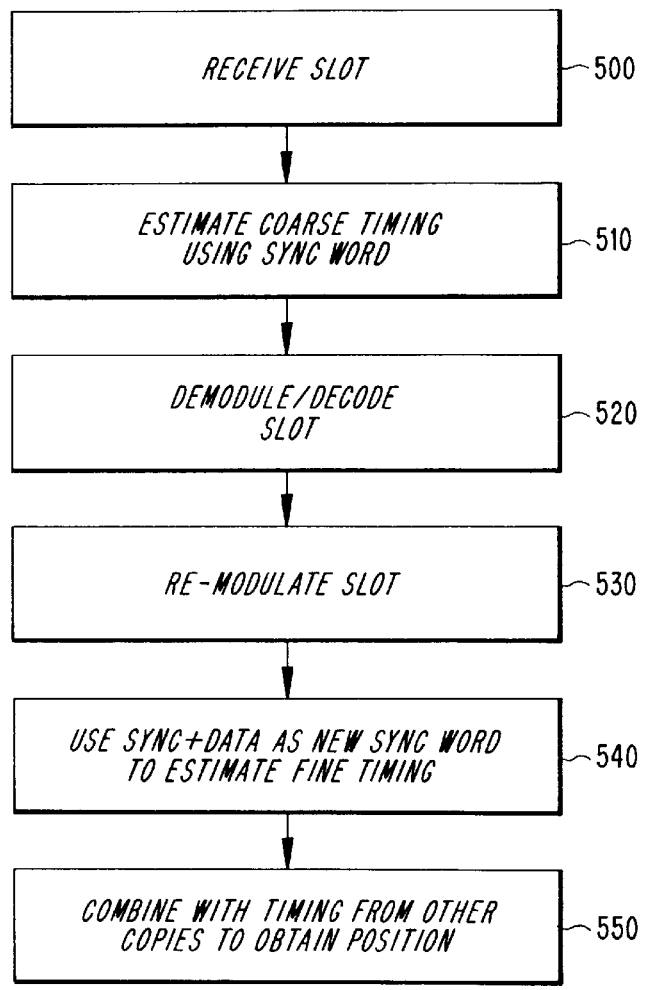

SYSTEMS AND METHODS FOR LOCATING REMOTE TERMINALS IN RADIOCOMMUNICATION SYSTEMS

BACKGROUND

Applicants' invention relates generally to radiocommunication systems, e.g., cellular or satellite systems and, more particularly, to techniques for supporting and enhancing emergency calling procedures in such systems.

The growth of commercial radiocommunications and, in particular, the explosive growth of cellular radiotelephone systems have changed the ways in which people communicate. One survey indicates that about 80% of the people who purchase mobile communication units and service subscriptions do so to enhance their personal security. Presumably, many of these subscribers would expect to use their mobile units to aid them in urgent situations, e.g., when their vehicle has become disabled or in an emergency situation requiring rapid medical and/or police response. In these circumstances it would be desirable that the radiocommunication system be able to independently determine a location of the mobile unit, particularly in the case where the subscriber does not know his or her precise location. Moreover, it is expected that the FCC will soon require that network operators forward the position of an emergency caller to the emergency service provider.

There are many techniques available to generate mobile unit location information. In a first category, the mobile unit could estimate its own position and send a message with its coordinates when placing an emergency call. This could be accomplished by, for example, providing the mobile unit with a Global Positioning System (GPS) receiver that receives location information from the GPS satellite network. The mobile unit can then transmit this information to the system, which would then forward it to the emergency service provider. This requires, however, significant modification of existing mobile units to include GPS receivers, as well as additional signalling between the mobile units and base stations.

Alternatively, the base stations which transmit signals to, and receive signals from, the mobile units could be used to determine the mobile unit's location. Various techniques, including attenuation of a mobile unit's signal, angle-of-arrival, and difference between the time-of-arrival (TDOA) of a mobile unit's signal at different base stations, have been suggested for usage in providing mobile unit location information. See, for example, the article entitled "Time Difference of Arrival Technology for Locating Narrowband Cellular Signals" by Louis A. Stilp, SPIE Vol. 2602, pp. 134–144. These solutions also have their drawbacks including the need to modify the many existing base stations, e.g., to provide array antennas to support angle-of-arrival techniques or to synchronize base station transmissions to support TDOA techniques.

A third category of strategies for locating mobile units in radiocommunication systems involves the provision of an adjunct system, i.e., a system which may be completely independent of the radiocommunication system or which may share various components (e.g., an antenna) with the radiocommunication system but which processes signals separately therefrom. This may be advantageous, for example, as an expedient solution to providing mobile unit location without modifying the large number of existing base stations in a system. For example, consider the equipment illustrated in FIG. 1 wherein the adjunct scanning units are not co-located with the base stations of radiocommunication system. Therein, a base station 1 supports radiocommunication within cell 2 and, in particular with mobile unit 3. An adjunct system, partially shown by way of scanning units 4, 5 and 6, monitors accesses to the system by mobile unit 3. When mobile unit 3 makes an emergency access, adjunct units 4, 5 and 6 use the mobile unit's transmissions on either a control channel or a traffic channel to provide information to a location processing center 7. The location processing center then uses the information provided by the various adjunct units to, for example, triangulate the position of mobile unit 3 and report this position to an emergency service center 8. More details regarding exemplary usages of adjunct systems can be found in U.S. Pat. No. 5,327,144 to Stilp et al., entitled "Cellular Telephone Location System", the disclosure of which is incorporated here by reference.

However, the Stilp patent relies upon TDOA techniques for estimating mobile unit location in its adjunct system. Under certain conditions, described in more detail below, TDOA techniques used alone may introduce an undesirable degree of error, for example due to a mobile's current position introducing errors into the TDOA calculations. Accordingly, it would be desirable to provide other techniques for estimating a mobile unit's position using adjunct systems.

SUMMARY

According to one exemplary embodiment of the present invention, selective usage of either TOA or TDOA measurement techniques by the adjunct system can be employed. For example, TDOA measurements can be used unless the GDOP parameter of the received signals passes a predetermined threshold, at which point TOA measurements can be used to obtain the mobile unit's position. Alternatively, a signal-to-noise threshold can be adopted as a mechanism for the adjunct system to select either TOA or TDOA measurement techniques.

According to another exemplary embodiment of the present invention, the effective length of the synchronization word sent in a transmitted burst can be increased. For example, the adjunct system can demodulate and decode a received time slot, and then remodulate and re-encode the same information to create a new "sync" word which is longer than the fields originally known in the received burst. Moreover, since the adjunct system receives multiple copies of uplink bursts from the various adjunct scanning units, for those copies which are not properly received, timing estimates can be determined using the long "sync" words created from other, better received copies.

According to another exemplary embodiment of the present invention, signal strength measurements made by a mobile unit and reported to the radiocommunication system can be used by the adjunct system to provide an estimate of the mobile unit's position. For example, the adjunct system can receive and decode these measurement reports and, using a priori knowledge of signal attenuation and base station transmit power, determine an estimate of the mobile station's position. This technique can be used as an alternative to the above-described TDOA/TOA techniques or in combination therewith.

BRIEF DESCRIPTION OF THE DRAWINGS

The features and advantages of Applicants' invention will be understood by reading this description in conjunction with the drawings, in which:

FIG. 4 is an illustration of the format of an uplink DCC time slot according to IS-136;

FIG. 5 is a flow chart illustrating a second exemplary embodiment of the present invention wherein a time slot is processed by an adjunct system to provide a longer synchronization word;

DETAILED DESCRIPTION

The following description is scripted in terms of a cellular radiotelephone system, but it will be understood that Applicants' invention is not limited to that environment and may be used in other types of wireless systems, e.g., systems which provide radiocommunication service using satellites, voice-trunked systems such as Land Mobile Radio (LMR) or Special Mobile Radio (SMR) systems, etc. Also, while the exemplary embodiments described below are provided in the context of Time Division Multiple Access (TDMA) communication systems, it will be understood by those skilled in the art that the present invention may be applied to systems using any access methodology, e.g,. Frequency Division Multiple Access (FDMA), Code Division Multiple Access (CDMA) and hybrids of FDMA, TDMA and/or CDMA.

Consider, solely for the purposes of example, the prevalent digital cellular radiotelephone system in North America known as the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVCs) and TDMA digital traffic channels (DTCs), and the system operator can dynamically replace one type with the other to accommodate fluctuating traffic patterns among analog and digital users. The AVCs and DTCs are implemented by frequency modulating radio carrier signals, which have frequencies near 800 megahertz (MHz) such that each radio channel has a spectral width of 30 kilohertz (KHz).

The IS-54-B standard also provides for a number of analog control channels (ACC) on which system accesses can be initiated and system overhead information can be communicated to the mobile units. A subsequent standard, referred to as IS-136, adds specifications for digital control channels (DCCs), which standard is incorporated here by reference.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. According to IS-54B and IS-136, each TDMA frame consists of six consecutive time slots and has a duration of 40 milliseconds (msec). Thus, each frame can carry from one to six channels (e.g., one to six radio connections), which may be a mixture of DTCs and DCCs used to convey information between a base station and a mobile station.

Figure 1:
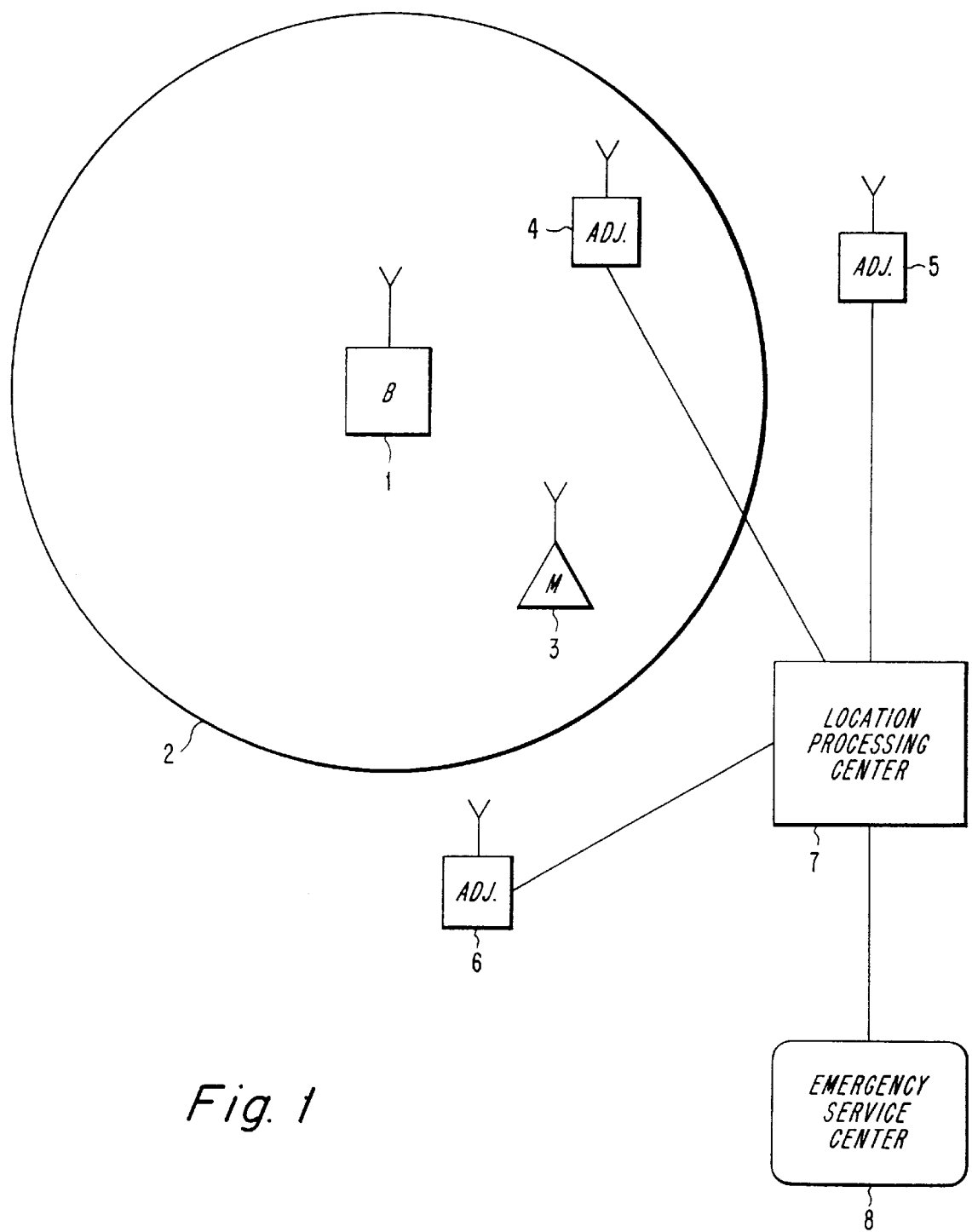
FIG. 1 is a diagram of an exemplary cellular radio telephone system and an adjunct monitoring system which provides mobile unit location information to an emergency service center, in which the present invention may be applied.
Figure 2:
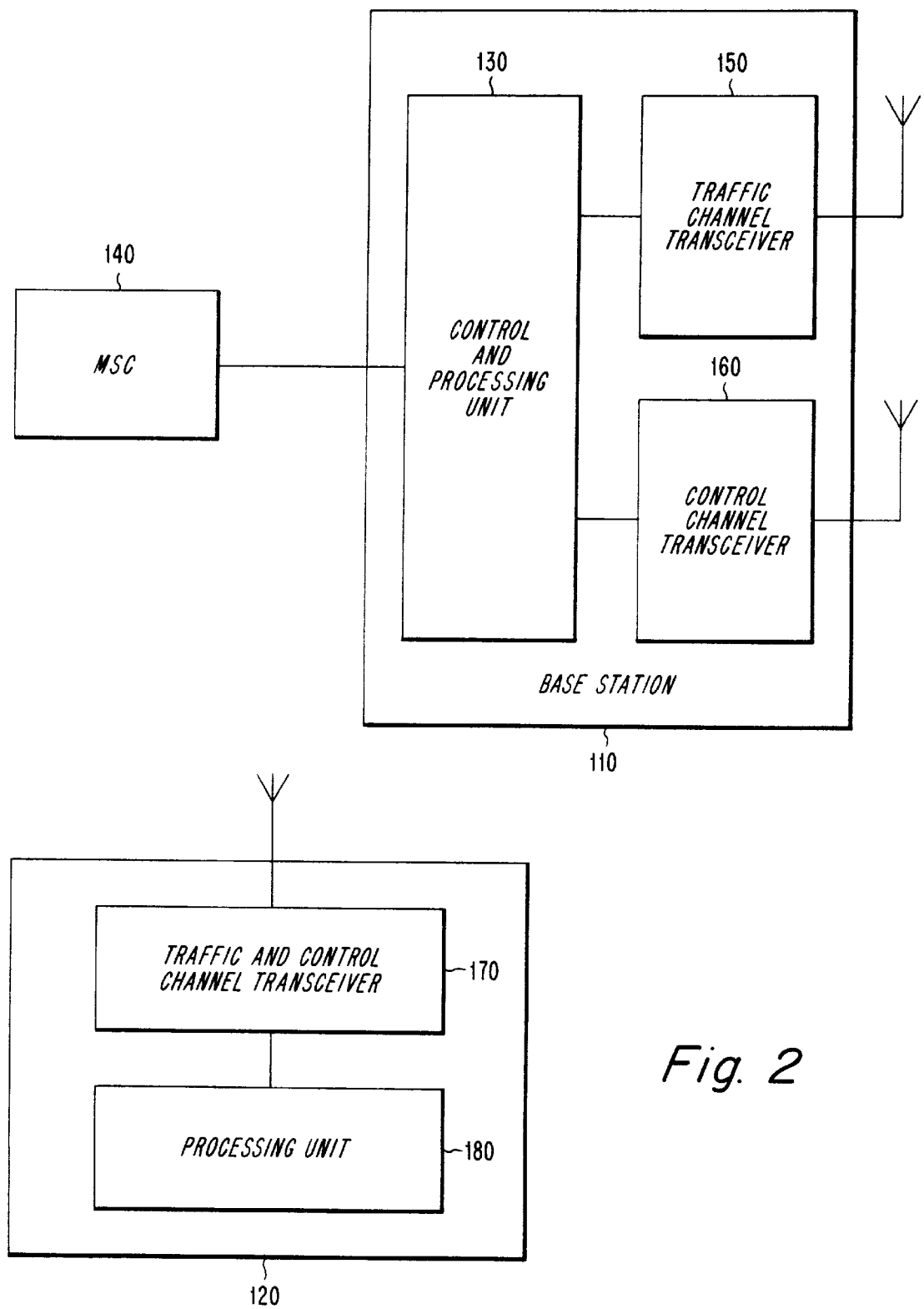
FIG. 2 illustrates an exemplary base station and mobile unit which may operate in accordance with the present invention.

FIG. 2 represents a block diagram of an exemplary cellular mobile radiotelephone system, including an exemplary base station 110 and mobile unit 120.

The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent application Ser. No. 07/967,027 entitled "Multi-Mode Signal Processing," which was filed on Oct. 27, 1992, both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency.

After an idle mobile unit 120 has located a control channel, e.g., by using digital control channel location information found on a traffic channel, it can then read the control information transmitted on that control channel, e.g., paging messages, using its traffic and control channel transceiver 170. For more detailed information relating to techniques for locating digital control channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference. When a connection between the mobile station 120 and the system is desired, the transceiver 170 will tune to a traffic channel assigned thereto by the system.

Once the mobile unit has found a control channel which satisfies a minimum set of rules, e.g., the mobiles must be able to receive the channel above a minimum received signal strength, the mobile may further evaluate this control channel with regard to certain system preferences stored in the mobile unit. For example, if the cell is barred (as described in IS-136), or the cellular operator is not the preferred operator (using the System Operator Code in IS-136), the mobile unit may then try to find another control channel.

If the data broadcast by the cellular system on the control channel (this part of the DCC is often referred as to the Broadcast Control Channel or BCCH) satisfies the preferences stored in the mobile unit, the mobile unit will listen or lock to this control channel to listen for paging messages and/or transmit call origination messages. At the same time, however, the mobile unit prepares for potential cell reselection since the mobile may be traveling and leaving the coverage area of the first selected control channel. Many known techniques exist for informing a mobile unit where (e.g., using one or more of frequency, time, and code) the neighboring control channels can be found in order for mobile units to test and compare these candidates with the current control channel to find the best control channel to serve the mobile unit given its current position. See, for example, U.S. Pat. No. 5,353,332 to Raith and Muller, entitled "Method and Apparatus for Communication Control in a Radiotelephone System" or U.S. Pat. No. 5,499,386, entitled "Best Server Selection in Layered Cellular Radio System" to Karlsson, the disclosures of which are incorporated here by reference.

As mentioned above, various techniques exist for receiving, at adjunct scanning stations 4, 5 and 6, the signals transmitted by the mobile unit 3 to determine an estimate of the mobile unit's position at, for example, a central location processing center 7 for forwarding to emergency service center 8. For example, such position location systems may use either Time of Arrival (TOA) measurements or Time Difference of Arrival (TDOA) measurements.

In a TOA system, the times of arrival of a signal transmitted from the mobile unit 3 at each of the receivers associated with adjunct scanning units 4, 5 and 6 is used to obtain the position. The adjunct scanning units 4, 5 and 6 may include receivers and processing circuitry similar to that described above for base station 110 which, accordingly, are not further described herein. The time taken for the signal to travel between the mobile and each adjunct receiver is proportional to the range of the mobile from the receiver. This relationship for the i'th receiver is given by:

$$c(t_{Ri} - t_T) = \sqrt{(X_i - x)^2 + (Y_i - y)^2 + (Z_i - z)^2}, \quad (1)$$

where c is the speed of light, $t_R$ is the time of reception at the receiver, $t_T$ is the time of transmission of the signal at the source, $(X_i, Y_i, Z_i)$ are the coordinates of the receiver and (x, y, z) are the coordinates of the source. If the times of arrival $t_{Ri}$ are measured at four or more adjunct receivers with known positions, then the coordinates (x, y, z) of the source and the transmission time of the signal $b_T$ can be estimated.

In a TDOA system, the times of arrival at two adjunct receivers are differenced to obtain an estimate of the source position through the following equations:

$$c(t_{Ri} - t_{Rj}) = \sqrt{(X_i - x)^2 + (Y_i - y)^2 + (Z_i - z)^2} - \sqrt{(X_j - x)^2 + (Y_j - y)^2 + (Z_j - z)^2} \quad (2)$$

Here the measured quantity is the time difference of arrival $t_{Ri}-t_{Rj}$ at the $i^{th}$ and the $j^{th}$ receivers. The position of the source can be obtained by using three or more independent time difference of arrival measurements.

For TOA measurements it is necessary that the signal transmitted by the source, i.e., the mobile unit, is known. On the other hand, TDOA measurements can be made without knowledge of the source signal by correlating the received signals at two adjunct receivers and finding the time delay at which the cross correlation of the two received signals peaks. This time delay is the TDOA measurement.

Errors in the position obtained by solving the above-described equations are dependent on the position of the source, e.g., the mobile unit, with respect to the adjunct receivers. This error is quantified by a measure known as the Geometric Dilution of Precision (GDOP). In practice, equations (1) and (2) are often linearized to obtain the position of the source from the measurements with lower complexity. This linearization effects the performance of TDOA based systems much more than it does the performance of TOA based systems, especially in situations with bad GDOP. See, for example, the article entitled "Radio Frequency Position Location Systems Review", authored by G. A. Mizusawa, Technical Report MPRG-TR-96-16, Bradley Dept. of Electrical Engineering, Virginia Tech, 1996.

TDOA measurements have been suggested for use in the adjunct scanning units, e.g., in the above-incorporated Stilp patent, since this enables position information to be derived even with unknown transmitted sequences. However, known sequences, such as equalizer training sequences, do exist within the transmitted information on both traffic and control channels in many radio communications systems, although these sequences are typically short in length. Applicants have recognized that if the adjunct receiver could make TOA measurements, then TOA based positioning could be used to augment a TDOA mode of operation. This would be especially useful in situations where the mobile's position induces a bad GDOP and thus large errors in the estimated position.

Accordingly, a first exemplary embodiment of the present invention proposes the selective use of TOA measurements by the adjunct system using any known sequences in the transmitted signal of the mobile unit. As will be described in more detail below, the sequences could be known a priori as in the case of a training (synchronization) sequence, or it could be obtained using demodulation of the received data or simply by transmitting predetermined sequences in parts of other channels such as control channel messages. The adjunct system, e.g., location processing center 7, can then selectively use either a TOA based or a TDOA based measurement scheme based on a number of parameters such as the geometrical relationship between the mobile unit and the adjunct receivers monitoring that mobile unit's transmissions, signal-to-noise ratio, etc. For example, if a mobile unit is very close to one adjunct receiver but relatively far away from two other adjunct receivers that are responsible for monitoring that mobile unit's transmissions, this may introduce a high level of positioning errors and the adjunct system may select TOA measurements in this case. For more information regarding the assignment of adjunct receivers to particular channels for monitoring purposes, the interested reader is directed to U.S. patent application Ser. No. 08/840,590, entitled "Systems and Methods for Locating Remote Units Operating in a Radiocommunication System Using an Adjunct System", filed on Apr. 22, 1997, which disclosure is incorporated here by reference.

Figure 3:
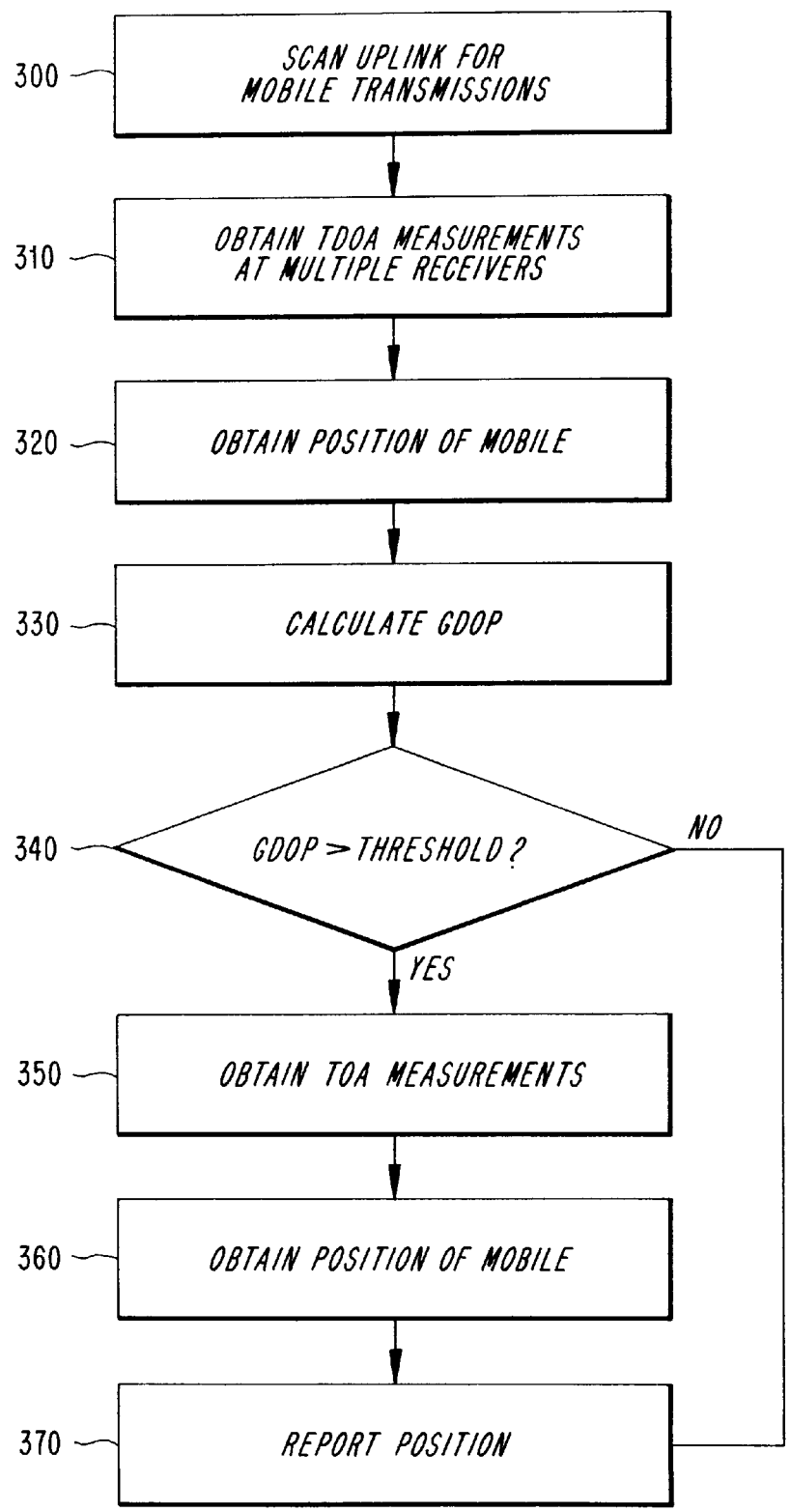
FIG. 3 is a flow chart illustrating a first exemplary embodiment of the present invention wherein a technique for selective use of TOA and TDOA techniques is provided.

For example, as depicted in the flow chart of FIG. 3, after scanning the uplink to identify emergency accesses at block 300, the system could initially use a TDOA measurement to obtain the position of the mobile unit at block 310. These measurements could then be used to identify the mobile unit's position as described above at block 320. The GDOP can then be calculated at block 330. GDOP calculations are well known to those skilled in the art and can be performed as described in the above-identified Mizusawa article or as described in the article entitled "Statistical Theory of Passive Location Systems" by Don J. Porrieri, IEEE Transactions on Aerospace and Electronics Systems, Vol. AES20, No.2, March 1984, the disclosure of which is incorporated here by reference.

If the GDOP is sufficiently low, i.e., if the mobile's position does not introduce excessive error into the TDOA calculation, then the position determined at block 320 can be reported to the emergency service center at block 370. Otherwise, if it is found that the position of the mobile leads to a poor GDOP at block 340, i.e., one that is less than a predetermined threshold, then the system can perform TOA measurements at block 350 to find the mobile station's position at block 350. This results in a greater probability that the estimated position is close to the mobile unit's actual position.

According to an alternative embodiment, the adjunct system could use TOA measurements when the signal-to-noise ratios of the mobile station's uplink signals as received by the adjunct receivers are low in order to reduce the effect of measurement errors on position error.

According to yet another exemplary embodiment of the present invention, TOA measurements can be used as the default. In this scenario, the adjunct system makes TOA measurements from the known part of the mobile's transmission, e.g., the synchronization word included in its uplink transmission. If the adjunct system is unsuccessful in obtaining a satisfactory TOA estimate based upon the known part of the mobile unit's transmissions, then the adjunct system can demodulate the signal and use it as a known sequence for correlation to obtain TOA measurements (as described below). However, if the correlation metric is still not satisfactory, it can then use a TDOA measurement where a longer sequence would be available for correlation.

As mentioned above, to estimate the time of arrival, the adjunct receiver uses known information that is present in the received signal to perform correlations. This known information might be in the form of synchronization words. For example, FIG. 4 depicts the format for an uplink time slot on a DCC according to IS-136. Therein, the bit lengths are specified under each field. Adjunct receivers monitoring uplink bursts transmitted by mobile units according to this format could use the SYNC fields to perform correlations and attempt to determine TOA.

However, synchronization words are typically of a short duration, and this constrains the accuracy of the measurement of the time of arrival. Thus, it may be desirable to have a longer synchronization word for better estimation of the time of arrival. According to another exemplary embodiment of the present invention, a technique is provided to obtain a longer synchronization word for TOA measurements.

With reference to the flow chart of FIG. 5, the location processing center first receives a time slot from an adjunct scanning unit and synchronizes thereto at blocks 500 and 510, respectively. Next, the location processing center 7 demodulates and decodes the data in the slot at block 520 using the same type of well known techniques used by base stations to perform these functions. The center may verify that a frame check sequence (FCS) is validated before proceeding with the next step.

At step 530, the processing center re-modulates/re-encodes the slot using the decoded data to form a new slot in which it now knows most of the information. Thus, it uses the re-encoded slot as a long sync word, and re-estimates the timing information at step 540 using the received data and this new long sync word. This timing information can then be combined, e.g, as described in equation (1), at step 550 to determine mobile unit position information for forwarding to the emergency service center.

Figure 6:
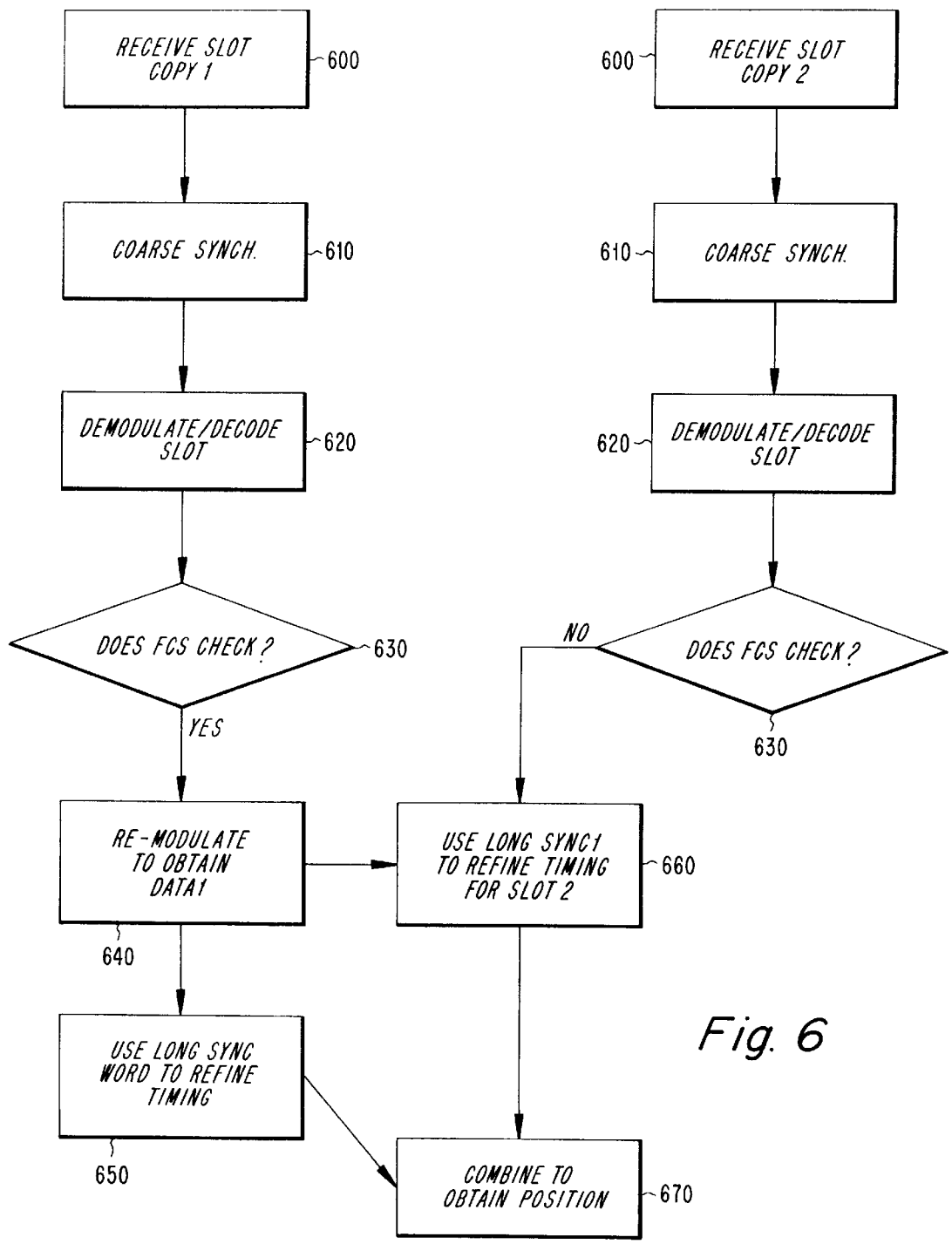
FIG. 6 is a flowchart depicting the processing of multiple copies of a time slot according to an exemplary embodiment of the present invention.

Moreover, the processing center 7 receives multiple copies of the same information, e.g., an uplink time slot transmitted by mobile unit 3 that is received by each of adjunct scanning units 4, 5 and 6. On some of these copies the noise may be high and a good timing estimate might not be obtainable with the short sync word. However, by decoding another copy, a long sync word can be obtained which may be used to estimate timing for otherwise disadvantaged copies. This process is illustrated in FIG. 6.

Therein, similar reference numerals are used to identify similar steps associated with processing different copies of the same information. For example, steps 600, 610 and 620 refer to receiving, synching to, demodulating and decoding two copies of the same slot received by different adjunct scanning units. For this example, assume that the FCS for copy 1 passed, but the FCS for copy 2 failed at blocks 630. As in FIG. 5, the flow for copy 1 proceeds to block 640 where the slot is re-modulated/re-encoded to obtain a new slot (data1) which can then be used as a long sync to refine the timing for copy 1 at block 650. However, this same long sync word can also be used at block 660 to refine the timing for copy 2 since copy 2 failed the FCS check. Again, this timing information is combined at step 670 to obtain the desired position information.

According to another exemplary embodiment of the present invention, mobile unit position information can be determined using the mobile unit's reported signal strengths of control and/or traffic channels broadcast by neighboring base stations. In IS-136, for example, each mobile unit transmits reports of measured signal strengths in support of mobile-assisted handoff (MAHO) and mobile-assisted channel allocation (MACA). These reports can be received and decoded by one or more of the adjunct scanning units. The signal strengths can then be used, e.g., by the location processing center 7, to estimate the mobile's position as follows.

Figure 7:
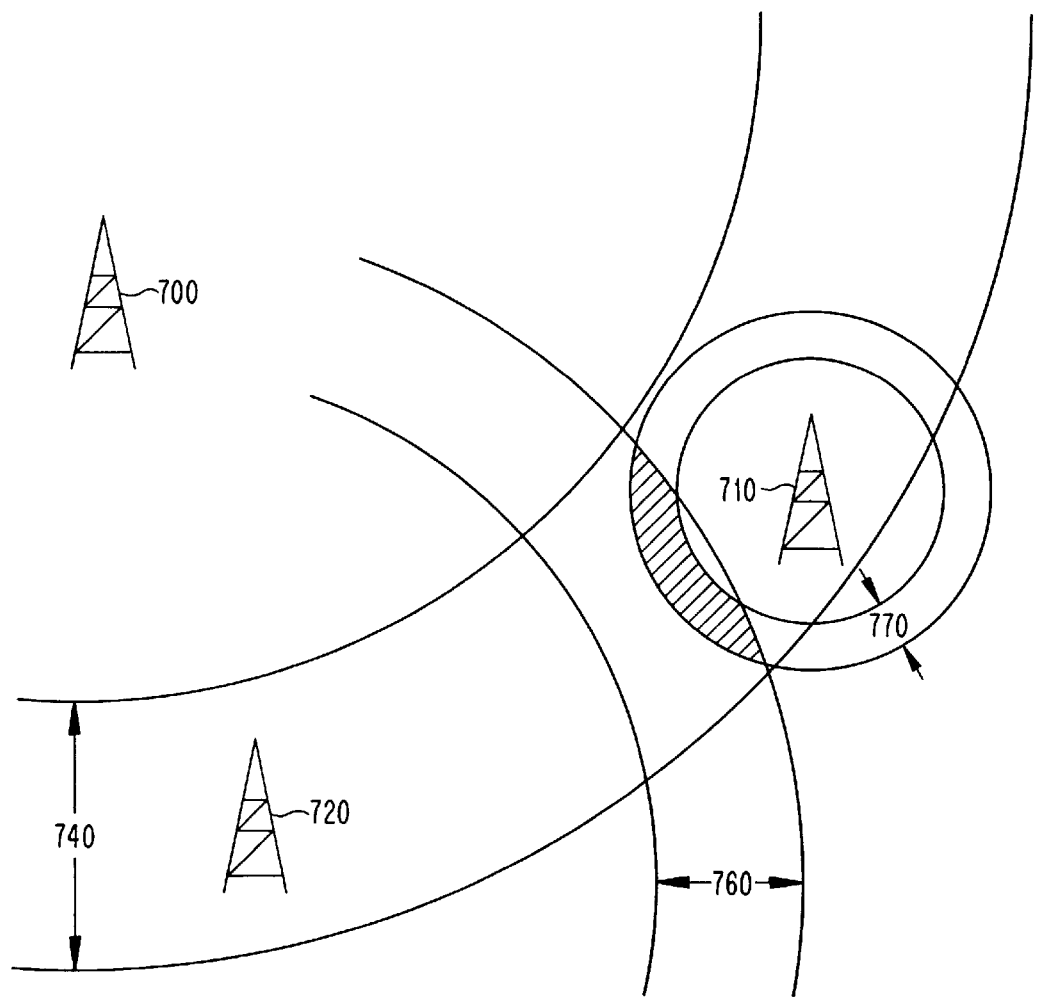
FIG. 7 illustrates position location of a mobile unit using reported signal strength measurements according to an exemplary embodiment of the present invention.

Consider the example illustrated in FIG. 7. Using any known, general path loss model for signal transmission on the downlink (e.g., the Okamura-Hata model), the adjunct system can estimate the mobile unit's position by evaluating its received signal strength with respect to N base stations. Here, N is selected to be three base stations 700, 710 and 720, although those skilled in the art will appreciate that two or more than three could also be used depending upon the information available and the desired degree of accuracy.

For each base station, given a priori knowledge of the base station's transmitting power and the signal strength at which the mobile unit receives that base station, the adjunct system can use the path loss model to determine a region within which the mobile station is most likely located. For example, the regions 740, 750 and 760 could be determined for base stations 700, 710 and 720, respectively. Then, the intersection of these three regions (indicated by the cross-hatching in FIG. 7) would be the estimated position for that mobile unit.

This technique for locating a mobile unit could be used instead of the more complicated (from a signal processing point of view) TDOA/TOA techniques described above. Alternatively, the MAHO and/or MACA information can be used in combination with these or other location techniques. For example, the MAHO and/or MACA information could first be used to obtain a coarse position estimate so that the call can be routed to an appropriate emergency service center. Then, other methods, e.g., TDOA and/or TOA, could be used to obtain a more accurate position which could then be forwarded to the earlier identified emergency service center. Another alternative is to first use a TDOA/TOA measurement technique to accurately identify a position of a mobile unit and to then update that position using the MAHO/MACA information as described above.

It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method for determining a position of a remote unit communicating with a radiocommunication system comprising the steps of:

receiving, at a plurality of measurement stations, a signal transmitted by said remote unit;

forwarding, by each of said plurality of measurement stations, said received signal to a central processing center;

selecting, by said central processing center, one of a time-of-arrival (TOA) and time-difference-of-arrival (TDOA) technique for processing said received signals, wherein the TOA and the TDOA technique is selected based on a predetermined threshold; and determining said position of said remote unit using said selected technique.

2. The method of claim 1, wherein said step of selecting further comprises the steps of:

calculating TDOA measurements using said received signals to obtain a first position associated with said remote unit;

determining a geometric dilution of precision (GDOP) value associated with said first position;

comparing said GDOP value to the predetermined threshold; and selectively using said first position as said position based upon a result of said comparing step.

3. The method of claim 2, wherein said step of selectively using said first position further comprises the steps of:

calculating, if said GDOP value is less than said predetermined threshold, TOA measurements for said received signals;

determining a second position based upon said TOA measurements; and using said second position as said position of said remote unit.

4. The method of claim 1 wherein said step of selecting further comprises the steps of:

identifying at least one signal-to-noise ratio associated with said received signals;

comparing said signal-to-noise ratio to the predetermined threshold; and selecting said TOA technique if said signal-to-noise ratio is less than said predetermined threshold.

5. The method of claim 1, further comprising the step of:

using signal strength measurements transmitted by said remote unit to update said position.

6. A method for determining a position of a remote unit communicating with a radiocommunication system comprising the steps of:

receiving, at a plurality of measurement stations, a signal transmitted by said remote unit;

forwarding, by each of said plurality of measurement stations, said received signal to a central processing center;

selecting, by said central processing center, one of a time-of-arrival (TOA and time-difference-of-arrival (TDOA) technique for processing said received signals, wherein said step of selecting further comprises the steps of using said TOA technique as a default technique and using said TDOA technique only if said TOA technique fails; and determining said position of said remote unit using said selected technique.

7. An adjunct system for determining a position of a remote unit communicating with a radiocommunication system comprising:

a plurality of measurement stations each for receiving a signal transmitted by said remote unit;

a central processing center which receives a copy of said received signal from each of said plurality of measurement stations, said central processing center including:

means for selecting one of a time-of-arrival (TOA) and time-difference-of-arrival (TDOA) technique for processing said received signals, wherein the TOA and the TDOA technique is selected based upon a predetermined threshold; and means for determining said position of said remote unit using said selected technique.

8. The adjunct system of claim 7, wherein said means for selecting further comprises:

means for calculating TDOA measurements using said received signals to obtain a first position associated with said remote unit;

means for determining a geometric dilution of precision (GDOP) value associated with said first position;

means for comparing said GDOP value to the predetermined threshold; and means for selectively using said first position as said position based upon a result generated by said comparing means.

9. The adjunct system of claim 8, wherein said means for selectively using said first position further comprises:

means for calculating, if said GDOP value is less than said predetermined threshold, TOA measurements for said received signals;

means for determining a second position based upon said TOA measurements; and means for using said second position as said position of said remote unit.

10. The adjunct system of claim 7 wherein said means for selecting further comprises:

means for identifying at least one signal-to-noise ratio associated with said received signals;

means for comparing said signal-to-noise ratio to the predetermined threshold; and means for selecting said TOA technique if said signal-to-noise ratio is less than said predetermined threshold.

11. The adjunct system of claim 7 further comprising:

means for using signal strength measurements transmitted by said remote unit to update said position.

12. An adjunct system for determining a position of a remote unit communicating with a radiocommunication system comprising:

a plurality of measurement stations each for receiving a signal transmitted by said remote unit;

a central processing center which receives a copy of said received signal from each of said plurality of measurement stations, said central processing center including:
means for selecting one of a time-of-arrival (TOA) and time-difference-of-arrival (TDOA) technique for processing said received signals, wherein said means for selecting further comprises means for using said TOA technique as a default technique and using said TDOA technique only if said TOA technique fails; and
means for determining said position of said remote unit using said selected technique.

\* \* \* \* \*